(12) United States Patent
Vidmar (10) Patent No.: US 8,028,527 B2
(45) Date of Patent: Oct. 4, 2011

(54) SYSTEM AND METHOD FOR CONVERTING MOIST AIR INTO WATER AND POWER

(75) Inventor: Robert J. Vidmar, Reno, NV (US)

(73) Assignee: Robert Joseph Vidmar, Reno, NV (US)

( * ) Notice: Subject to any disclaimer, the term of this patent is extended or adjusted under 35 U.S.C. 154(b) by 455 days.

(21) Appl. No.: 12/209,612

(22) Filed: Sep. 12, 2008

(65) Prior Publication Data

US 2009/0072537 A1    Mar. 19, 2009

Related U.S. Application Data

(60) Provisional application No. 60/993,760, filed on Sep. 14, 2007.

(51) Int. Cl.
*F01K 25/06* (2006.01)
(52) U.S. Cl. ............... 60/649; 60/655; 60/682
(58) Field of Classification Search .......... 60/649, 60/655, 670, 682, 683
See application file for complete search history.

(56) References Cited

U.S. PATENT DOCUMENTS

| | | | |
|---|---|---|---|
| 1,816,592 A | 7/1931 | Knapen | |
| 3,675,442 A | 7/1972 | Swanson | |
| 3,748,867 A | 7/1973 | Bel Hamri | |
| 3,905,201 A * | 9/1975 | Coveney et al. | 62/646 |
| 4,080,186 A | 3/1978 | Ockert | |
| 4,134,269 A | 1/1979 | Arzet | |
| 4,182,132 A | 1/1980 | Nasser et al. | |
| 4,197,713 A * | 4/1980 | Bulang | 62/94 |
| 4,219,341 A | 8/1980 | Hussmann | |
| 4,313,312 A | 2/1982 | Ito et al. | |
| 4,315,599 A | 2/1982 | Biancardi | |
| 4,333,992 A * | 6/1982 | Healy | 429/414 |
| 4,433,552 A | 2/1984 | Smith | |
| 4,584,840 A | 4/1986 | Baumann | |
| 4,612,019 A | 9/1986 | Langhorst | |
| 4,783,201 A | 11/1988 | Rice et al. | |
| 4,953,366 A | 9/1990 | Swift et al. | |
| 5,165,243 A | 11/1992 | Bennett | |
| 5,174,130 A | 12/1992 | Lucas | |
| 5,233,843 A | 8/1993 | Clarke | |
| 5,275,002 A | 1/1994 | Inoue et al. | |
| 5,295,791 A | 3/1994 | Meise | |
| 5,456,082 A | 10/1995 | Keolian et al. | |
| 5,553,459 A | 9/1996 | Harrison | |

(Continued)

OTHER PUBLICATIONS

Grover, M.R. and Bruckner, A.P., "Water Vapor Extraction From The Martian Atmosphere By Adsorption In Molecular Sieves", Dept. of Aeronautics and Astronautics, University of Washington, Box 352400, Seattle, WA 89195-2400.

(Continued)

*Primary Examiner* — Hoang Nguyen
(74) *Attorney, Agent, or Firm* — SilverSky Group, LLC (57) ABSTRACT

The present invention is directed to power generation systems and methods for converting naturally occurring moist air into power and water, enabling generation of power without carbon combustion and without the release of green-house gasses which usually accompany thermodynamic power generation. According to one embodiment, a compressor module is used to greatly compress enriched water vapor drawn from the surrounding moist air. The compressed water vapor is then condensed into output water by a working fluid, while the heated working fluid is used in a Rankine-cycle power generation loop to turn a turbine and thereby create transmittable electrical power.

57 Claims, 6 Drawing Sheets

U.S. PATENT DOCUMENTS

| | | |
|---|---|---|
| 5,601,236 A | 2/1997 | Wold |
| 5,857,344 A | 1/1999 | Rosenthal |
| 6,116,034 A | 9/2000 | Alexeev et al. |
| 6,230,503 B1 | 5/2001 | Spletzer |
| 6,360,549 B1 | 3/2002 | Spletzer et al. |
| 6,453,684 B1 | 9/2002 | Spletzer et al. |
| 6,485,545 B1 | 11/2002 | Ohlrogge et al. |
| 6,537,514 B1 * | 3/2003 | Prasad et al. .............. 423/437.1 |
| 6,551,732 B1 * | 4/2003 | Xu ................................ 429/412 |
| 6,574,979 B2 | 6/2003 | Faqih |
| 6,588,225 B1 | 7/2003 | Hodgson et al. |
| 6,684,648 B2 | 2/2004 | Faqih |
| 6,705,092 B1 | 3/2004 | Zhou et al. |
| 6,719,825 B2 | 4/2004 | Wedge et al. |
| 7,121,101 B2 | 10/2006 | Merritt |
| 7,604,883 B2 * | 10/2009 | Schaller et al. .............. 429/437 |
| 2003/0159457 A1 | 8/2003 | Faqih |
| 2003/0167779 A1 | 9/2003 | Steiner |

OTHER PUBLICATIONS

Bejan, A, "Advanced Engineering Handbook, Third Edition", John Wiley & Sons, Hoboken, NJ, 2006, pp. 131-134, 363-390, and 848-851.

Boyce, M.P., "Gas Turbine Engineering Handbook, Third Edition", Gulf Professional Publishing, Boston, MA, 2006, pp. 274-276.

Kearton, W.J., "Steam Turbine Operation, 7th Edition", Sir Isaac Pitman & Sons, London, England, 1964, pp. 1-27.

Salisbury, J.K., "Steam Turbines and Their Cycles", John Wiley & Sons, New York, NY, 1950, pp. 43-93.

Reynolds et al., "Engineering Thermodynamics, 2nd Edition", McGraw-Hill, New York, NY, 1977, pp. 240-250 and 287-311.

Kreith et al., "Principles of Solar Engineering", McGraw-Hill Book Co., New York, NY, 1978, pp. 577-590.

Ahlen, A. T., "A Study of the Diffusion of Sorbed Water Vapor Through Paper and Regenerated Cellulose Films", Ph. D. Dissertation, The Institute of Paper Chemistry, Appleton, WI, 1969, pp. 90.

* cited by examiner

SYSTEM AND METHOD FOR CONVERTING MOIST AIR INTO WATER AND POWER

CROSS-REFERENCES TO RELATED APPLICATIONS

This is a utility patent application, taking priority from provisional patent application Ser. No. 60/993,760, filed Sep. 14, 2007.

BRIEF DESCRIPTION OF THE INVENTION

The present invention is directed to power generation systems and methods for converting naturally occurring moist air into power and water, enabling generation of power without carbon combustion and without the release of green-house gasses which usually accompany thermodynamic power generation.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Water vapor exists at significant levels in most geographic locations on earth. This water vapor takes the form of moist air. Processing this moist air into dry air and water results in a net surplus of energy for the process. This energy can be captured and converted to commercially transmittable energy, electrical power, through a thermodynamic cycle process coupled to a water vapor separation module which extracts enriched water vapor from naturally occurring moist air.

Direct solar energy generation systems can only convert a small percentage of the energy that reaches earth from the sun. A large amount of the sun's energy works to evaporate water from large and small bodies of water. The sun evaporates water everywhere on earth and the process expends 2.26 MJ/kg (429.9 Btu/lbm) for each kg (2.204 lbm) of water evaporated. A mass of 1 kg (2.204 lbm) of water with a mixing ratio of 0.3% in dry air represents 2.26 MJ (199 Btu) of water vapor enthalpy distributed in a volume of approximately 333 cubic meters (11,759 cubic feet). The herein described methods, and system for carrying out the disclosed methods, involve enriching ambient water vapor and then releasing the water vapor enthalpy in a heat-exchange boiler, which vaporizes a working fluid used in a Rankine-cycle turbine generator system.

The Rankine-cycle is frequently used in power generation plants. Usually, some sort of carbon combustion creates the heat used to vaporize the working fluid used in the Rankine-cycle. While this method of generating power via carbon combustion is used worldwide, because of its relative inexpensiveness, there are many drawbacks to carbon combustion-based Rankine-cycle plants. For example, the discharge from the combustion of fossil fuels is released into the air. This discharge contains carbon dioxide and water vapor, as well as other substances such as nitrogen, nitrous oxides, sulfur oxides, and (in the case of coal-fired plants) fly ash and mercury. These hazardous substances are obviously a threat to human health and animal life. And the released carbon dioxide is widely believed to be at least a major contributor, if not a cause, of global warming and climate change. Development of a non-carbon-combustion Rankine-cycle power generation plants would be highly advantageous.

DETAILED DESCRIPTION OF THE INVENTION

Although the present invention may be described in terms of various systems, the present invention also relates to methods for performing the operations herein. Accordingly, the following discussion applies equally to systems for converting moist air into water and power, and to methods for converting moist air into water and power.

Figures 1A, 1B:
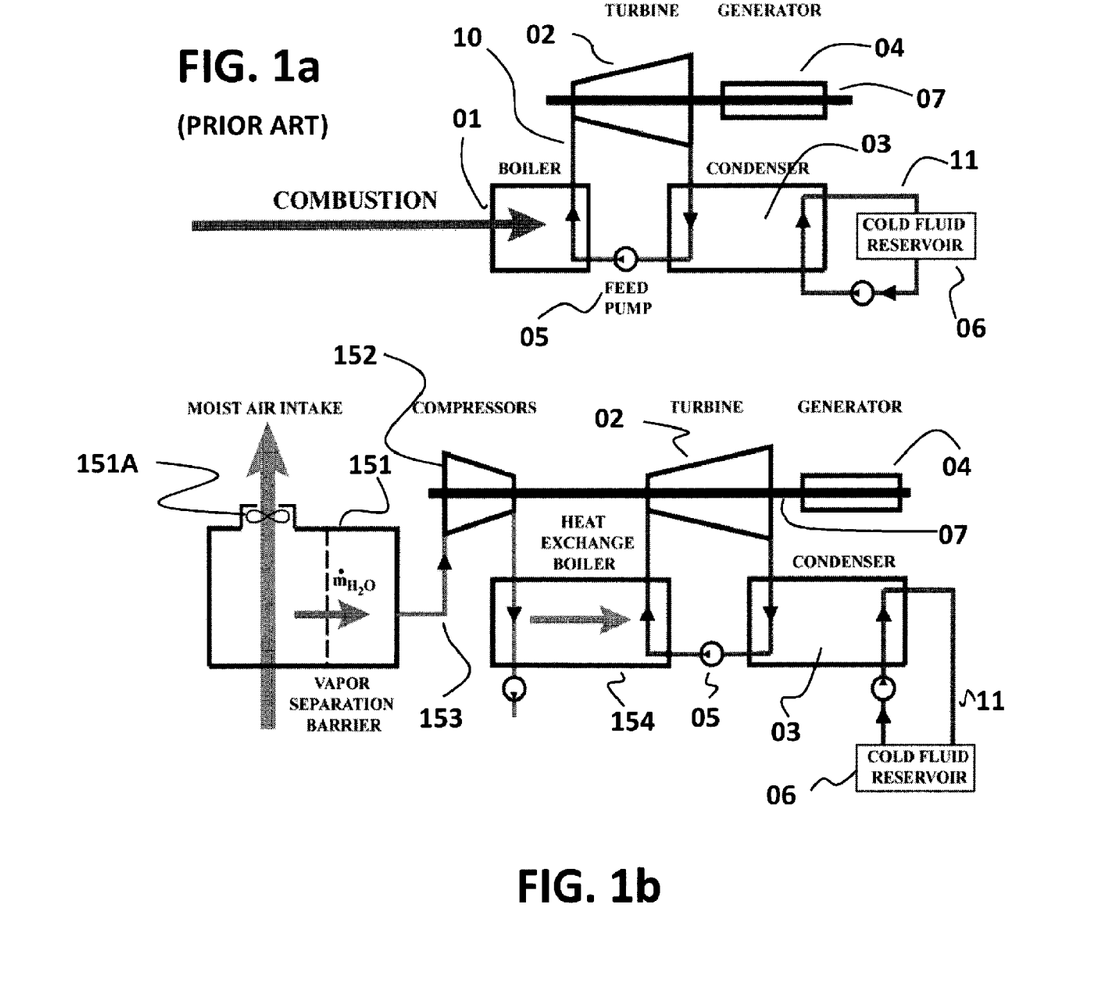
FIG. 1a illustrates an exemplary Rankine-cycle power generation plant utilizing carbon combustion in accordance with the prior art.
FIG. 1b illustrates an exemplary system and method for converting moist air into water and power, in accordance with the present invention.

The herein disclosed system for converting moist air into power and water utilizes a modified Rankin-cycle in most embodiments, and may utilize related thermodynamic cycles (such as the Stirling-cycle and the Ericsson-cycle) in some alternative embodiments. A Rankin-cycle is a thermodynamic cycle in which heat is converted to work. Power plants use the Rankin-cycle to generate about 80% of all electrical power used in the United States, and most of the electrical power used worldwide. FIG. 1a illustrates a traditional prior art Rankin cycle system with a condenser, as is used to generate electrical power throughout much of the world.

In FIG. 1a, heat is added to boiler 01. This heat is created by a combustion process, which usually involves burning some sort of carbon-based fuel, such as biomass, petroleum, or natural gas. At boiler 01, the heat from the combustion interacts with a working fluid which is pumped through working fluid feed 10 by feed pump 05. The interaction of the heat with the working fluid at boiler 01 causes some transfer of heat into the working fluid, increasing the temperature and pressure of the working fluid. After leaving boiler 01, the working fluid is carried by working fluid feed 10 to turbine 02. The working fluid enters turbine 02 at a relatively high pressure and temperature, makes its way through turbine 02, and then exists turbine 02 at a lower pressure and temperature. Turbine 02 is generally a rotary engine whose blades are turned by the high pressure and high temperature working fluid entering turbine 02 from boiler 01. When turbine 02's blades are turned, shaft 07 also turns, causing generator 04 to generate electricity.

The working fluid then exits turbine 02 at a lower pressure and temperature, and is then fed through condenser 03, which changes the working fluid back to a liquid state, and can also further lower the temperature or pressure, before the working fluid is fed by feed pump 05 back to boiler 01 to complete the cycle. Condenser 03 causes the working fluid to interact with a fluid (controlled by cold fluid feed 11) at a much lower temperature relative to the working fluid exiting turbine 02. Condenser 03 usually utilizes a large body of cool water, such as a nearby river or lake, to interact with the working fluid. The end result of the Rankine-cycle is a relatively efficient system for continuously converting combustion heat (obtained from burning carbon-based fuels) into electricity.

FIG. 1*b* illustrates a preferred embodiment of the herein disclosed invention, which is an alternative Rankine-cycle (or in some embodiments another thermodynamic-cycle) electrical power generation system that is able to utilize greatly compressed water vapor (extracted from naturally moist air) in place of combustion heat to produce electricity. In FIG. 1*b*, moist air is drawn into the system through vapor separation module 151. A vapor separation module may alternatively be referred to as a vapor separator. Vapor separation module 151 can perform one or more of several functions. The main function of vapor separation module 151 is to enrich the level of water vapor in the air being drawn through the system. Vapor separation module 151 can contain a permeable barrier, which may be formed of cellulose acetate or another material with similar characteristics, through which water vapor is drawn.

Other possible functions which may be performed by vapor separation module 151 are to remove noncondensable gasses and/or to generate relatively small amounts of electrical power through incorporation of wind-turbines 151A in the air stream of the vapor separation module 151. These additional optional functionalities of vapor separation module 151 will be discussed in greater detail below.

The enriched water vapor is extracted from the moist air by the vapor separation module 151 and travels through water vapor feed 153 to compressor module 152, where the water vapor is compressed. Compression of the water vapor at compressor module 152 increases the pressure and temperature of the water vapor. Compressor module 152 may be one compressor, or may instead be a subsystem of two or more compressors which perform a staged compression of the water vapor. Staged compression, which alternatively may be referred to as a multi-step compression process, greatly increases the water vapor pressure over several steps of compression, and is able to achieve higher compression ratios (leading to higher overall system efficiencies) than a single compressor system. Multi-stage compression embodiments will be explained in greater detail below.

The compressed water vapor then leaves compressor module 152, traveling through water vapor feed 153 to heat exchanger module 101, where the compressed water vapor interacts with a turbine working fluid. Heat exchanger module 154 may be one heat exchanger boiler or may, when staged compression is utilized, be a subsystem of two or more heat exchanger boilers. Multi-stage exchanger boiler systems will be explained in greater detail below.

Heat exchanger module 154 facilitates the compressed water vapor moving in close proximity past a working fluid being fed in the opposite direction by working fluid feed 05. The close proximity of the two fluids causes the water vapor to condense, creating output water (a useful by-product of the herein disclosed systems), and causes the working fluid to heat up greatly. The working fluid, at a high temperature, is then fed by working fluid feed 05 through turbine 02. Turbine 02, condenser 03, generator 04, shaft 07, cold fluid feed 11 and cold fluid reservoir 106 can be the same components utilized in traditional combustion heat Rankine-cycle power generation systems. Many variations of the working fluid thermodynamic-cycle are possible and may be used to convert the heat released from the condensing water vapor (such as Rankine-cycle, Stirling-cycle, Ericsson-cycle, and variations of them). Such practical variations will be appreciated by those skilled in the art and are intended to be covered by this specification.

The following conference papers cover the same material disclosed herein and additionally provide standard thermodynamic analysis of the disclosed systems. They have been archived by ASME: American Society of Mechanical Engineers & AIAA: American Institute of Aeronautics and Astronautics, respectively, and are hereby incorporated by reference:

Vidmar, R., "Converting Moist Air into Water and Power," ASME Power 2008, 22-24 Jul. 2008, Orlando, Fla., POWER2008-60032, pp 12, 2008.

Vidmar, R., "Site Location Considerations Associated with Conversion of Moist Air into Water and Power," International Energy Conversion Engineering Conference IECEC, 28-30 July, Cleveland, Ohio, AIAA-2008-5778, pp 22, 2008.

Vapor separation module 151 may contain a barrier which is used to separate enriched water vapor from the input moist air. Moist air enters vapor separation module 151 and is drawn across a barrier material at approximately 0.1 m/s before exiting the opposite side of vapor separation module 151. A fan, in place of wind-turbine 151A, may be utilized to draw the moist air through vapor separation module 151, or if the wind conditions are appropriate no fan may be needed. In situations where the surrounding wind conditions negate the need for a fan to draw the moist air through, wind-turbine(s) 151A may be placed within the vapor separation module structure to capture a portion of the wind energy that is naturally expended carrying the moist air through the vapor separation module. Alternatively, dual-purpose fans may be incorporated which can be used to actively draw moist air through when wind conditions are poor, but which can also convert natural wind-driven movement of moist air into electrical power when wind conditions are more favorable and the fan is not needed for actively drawing moist air through.

The barrier used to extract water vapor from the moist air traveling through vapor separation module 151 is a thin film that may be formed of cellulose-acetate, or another type of plastic or other material with similar characteristics. An optimum barrier is highly permeable to water vapor and much less permeable to $N_2$ and $O_2$. The film forming the barrier may be relatively thin and consistent; for example, one mil (0.001 inch, 25.4 micrometers) thick with no pinholes or other leaks. A pressure gradient is created across the barrier from the atmospheric side (from which the naturally moist air is drawn) to the vacuum side (which is created by the pull of compressor module 152), resulting in the net transport of water vapor across the barrier to the vacuum side and into water vapor feed 153. The barrier surface area is proportional to the barrier thickness and inversely proportional to the pressure difference across the barrier. Cellulose acetate is favorable because it facilitates the transmission of water vapor across the barrier; but some $N_2$ and $O_2$ may also cross the barrier. The magnitude of the permeability and small pressure gradient across the barrier requires that the overall barrier surface area be relatively large.

The fundamental component in a large barrier system is a single barrier panel that can be joined in parallel to form a larger system. An example large-scale system for converting moist air into water and power may utilize standard 40-ft shipping containers. Shipping containers of this size are abundantly available in the United States and relatively inexpensive because many more goods are imported to the United States in such containers than are typically exported in such containers. Each shipping container may be fitted with approximately 3,500 $m^2$ of barrier surface area. A shipping container may be fitted with approximately 76 sealed barrier panels, each with a 2.3 m height and a 10.0 m width mounted vertically along the long axis of the container for a total area of 3,496 $m^2$. A preferred embodiment, however, fits each shipping container with approximately 450 sealed barrier panels, each with a 2.3 m height and a 1.7 m width, mounted vertically within the container, across the width of the container for an area of 3,519 $m^2$.

Figure 2:
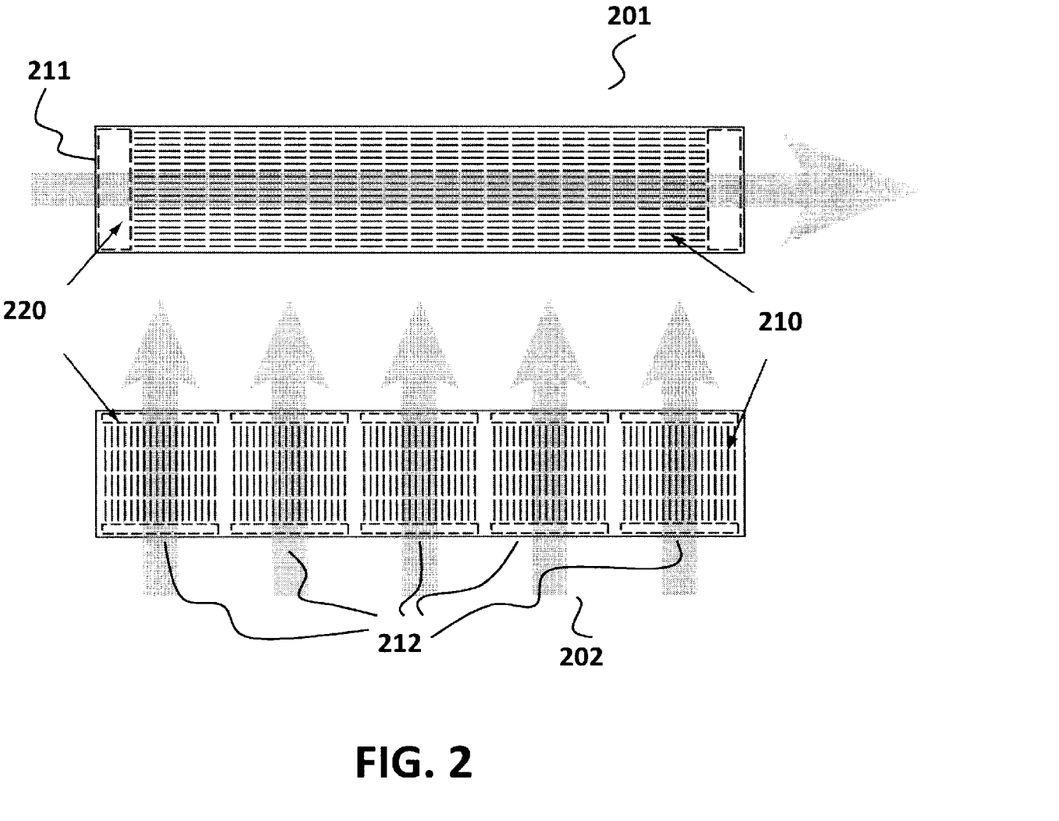
FIG. 2 illustrates two possible arrangements for barrier panels within a standard 40-ft shipping container, in accordance with the present invention.

FIG. 2 illustrates two example arrangements of barrier panels, in accordance with the present invention, within standard 40-ft shipping containers. Shipping container 201 is arranged with one intake aperture 211 so that moist air travels the entire length of the 40-ft shipping container. Such an arrangement allows the moist air to travel along a large number of barrier panels. Shipping container 202 is arranged with five intake apertures 212 along the long side of the shipping container. Such an arrangement allows more volume of moist air to be drawn through the container, utilizing the five intake apertures 212, but the moist air does not travel along as large a number of barrier panels. Fans, filters, and/or louvers 220 may be incorporated into or adjacent to the intake apertures. Fans, as discussed above, may be used to draw moist air through and/or as wind-turbines to generate electrical power. Filters may be used to remove particulate matter from ambient air. Louvers 220 may be used to regulate air flow through the vapor separation module in surrounding high wind conditions and could be placed at just the intake aperture 211 or apertures 212 or at both the intake(s) and exit(s) of each shipping container 201.

Figure 3:
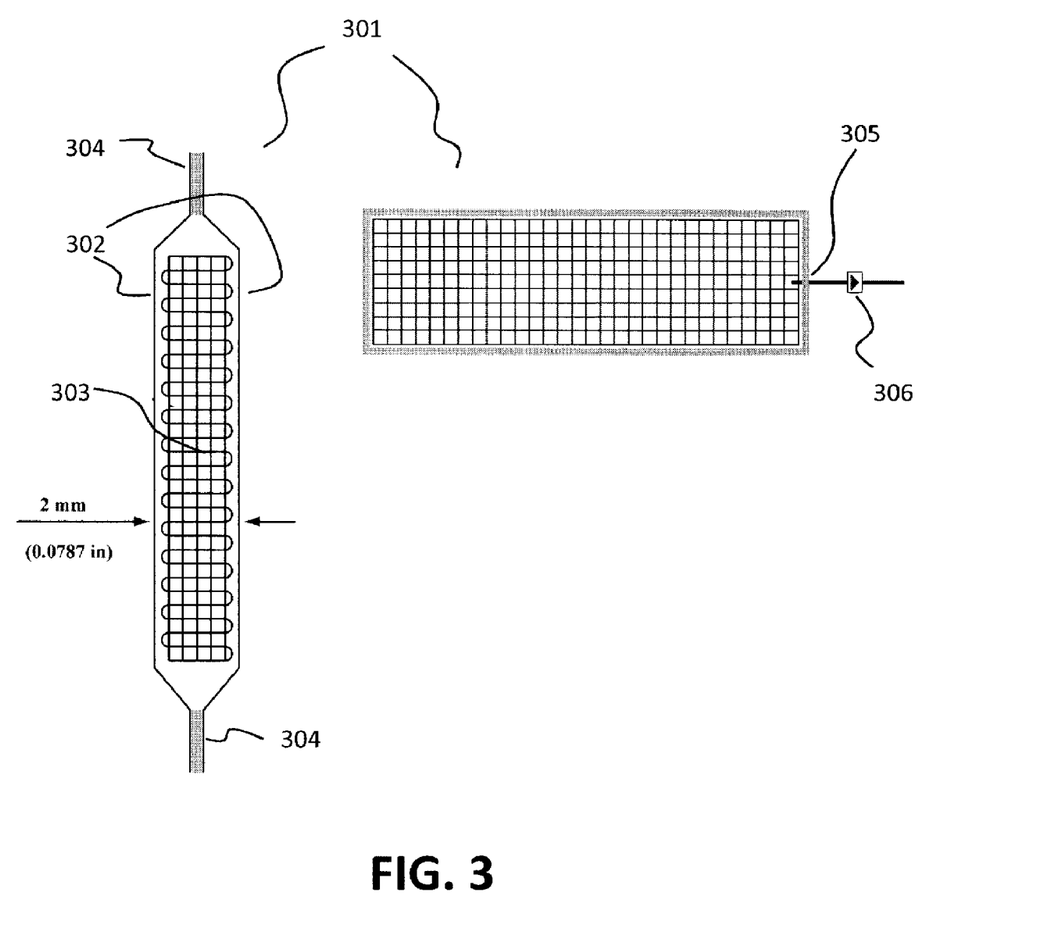
FIG. 3 illustrates a barrier panel, in accordance with the present invention.

FIG. 3 illustrates two views of a barrier panel 301 which may be used individually or in parallel with multiple additional barrier panels, to extract or enrich water vapor from the moist air drawn through the vapor separation module. Each panel 301 may be formed of two sheets of barrier material 302. A layer of mesh 303 can be used to separate the barrier sheets and to provide a relatively high conductance path for water-vapor extraction. The panel is sealed on all edges 304, and one end may have a hypodermic tube 305 for water vapor extraction, and may have an excess flow valve 306 to seal a panel off from the compressor if a large leak develops. The entire barrier panel may be quite thin (possibly as thin as 2 mm, as is shown in FIG. 3 as an example) including both sheets of barrier material 302 and the layer of mesh 303. Dimensions, however, are only provided as examples because barrier panel 301 will function properly at varying thicknesses.

The presence of $N_2$ and/or $O_2$ in the water vapor moving through the compressor module and the heat exchanger module is not ideal. These gasses will not be compressed properly by the compressor module nor condensed properly by the heat exchanger module, therefore causing less than ideal heat to be transferred to the working fluid in the heat exchanger module, resulting in less electrical power generation, and lowering overall system efficiency. The $N_2$ and $O_2$, and any other noncondensable gasses present after being drawn through the barriers, may be removed by a noncondensable gas removal subsystem incorporated into the vapor separation module.

A noncondensable gas removal subsystem may be simply another barrier-type system whereby water vapor containing a small fraction of noncondensible gasses is drawn past another set of barriers which are highly impermeable to water vapor but highly permeable to the unwanted gasses, which are thereby separated from the water vapor. Alternatively, the noncondensable gas removal subsystem may utilize barriers which are permeable to $N_2$ and/or $O_2$ while being impermeable to water, thus pulling the unwanted noncondensable gases from the water vapor while allowing the enriched water vapor to pass alongside the barrier unimpeded. Those skilled in the art will recognize that there are many possible methods to remove unwanted noncondensable gasses from the water vapor and any such method may be appropriately incorporated into the herein disclosed system for converting moist air into water and power.

Figure 4:
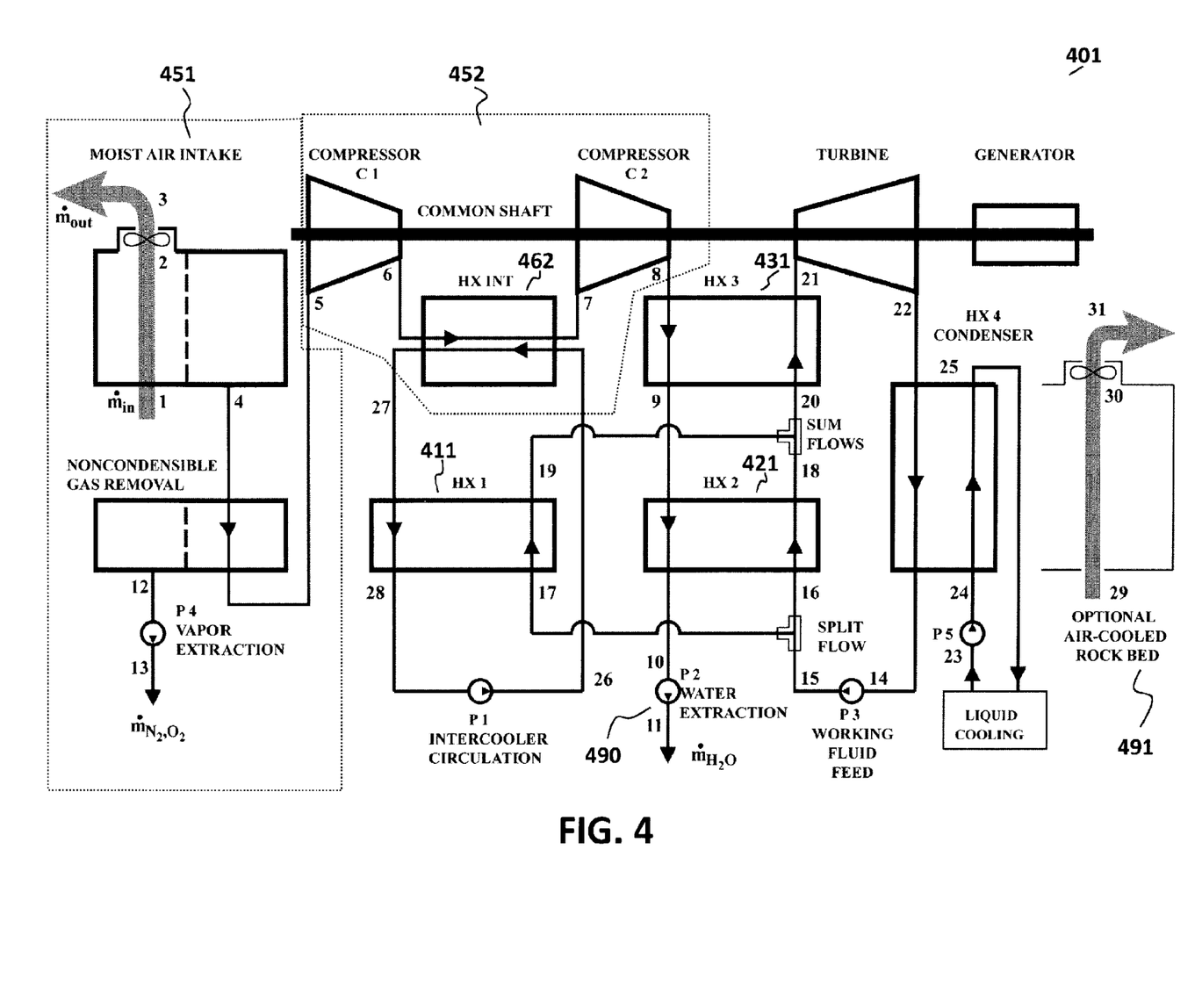
FIG. 4 illustrates an exemplary two-stage compression plus Rankine-cycle system for converting moist air into water and power, in accordance with the present invention.
Figure 5:
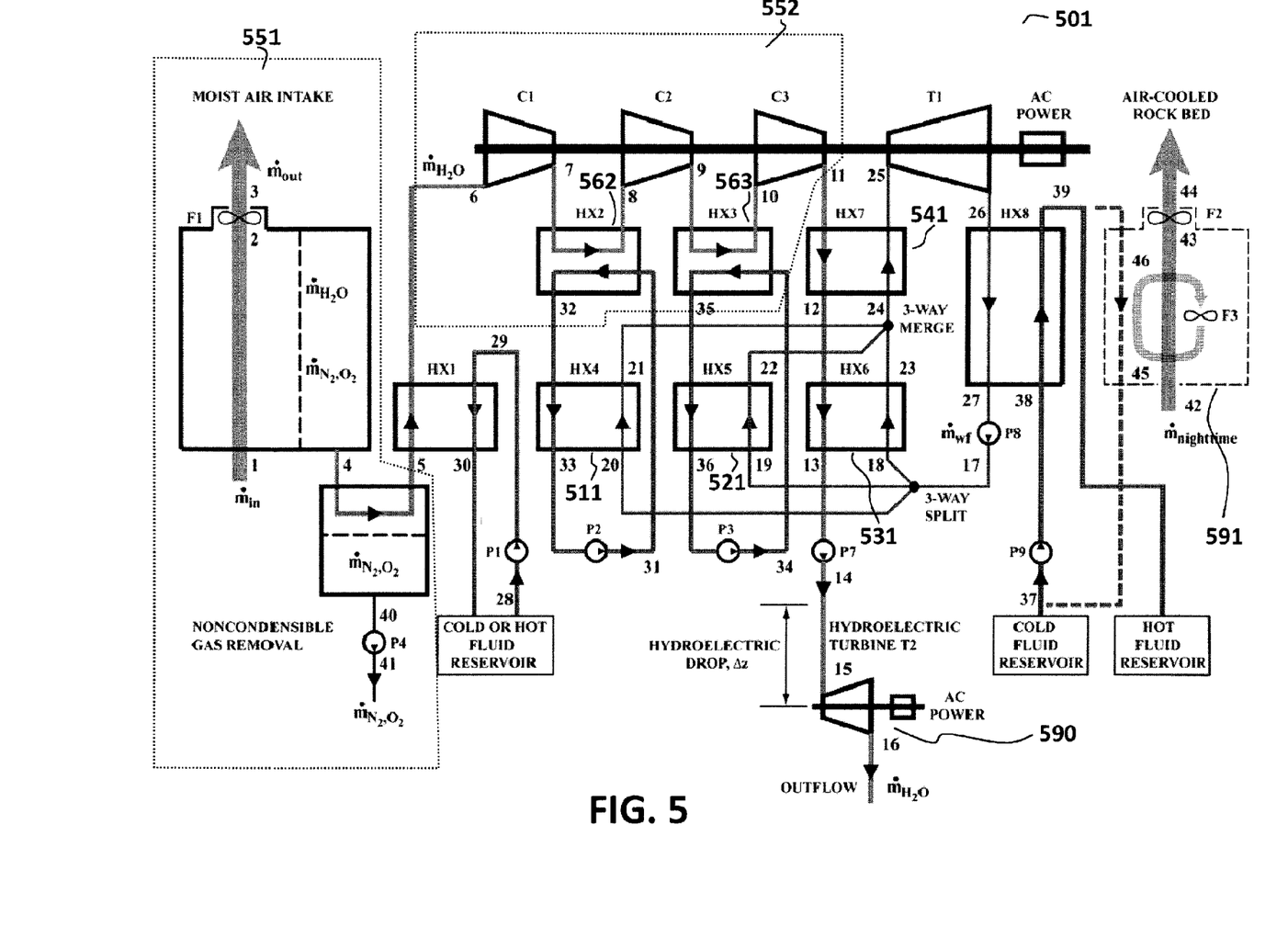
FIG. 5 illustrates an exemplary three-stage compression plus Rankine-cycle system for converting moist air into water and power, in accordance with the present invention.

FIG. 4 and FIG. 5 illustrate multi-stage compression embodiments of the herein disclosed system for converting moist air into water and power.

FIG. 4 shows a two stage compression system 401 utilizing two compressors (C1 and C2) and a working fluid moving through a Rankine-cycle. Compressor module 452 includes the two compressors, enabling increased compression of the water vapor over what would be possible using only one compressor. As seen in FIG. 4, a heat exchanger intercooler 462 (HX INT) may be used between the two compressors. A system designed for two-stage compression may utilize three heat exchangers 411 (HX1), 421 (HX2), and 431 (HX3). A working fluid is heated by intercooler 462 at heat exchanger 411 and by condensation of the water vapor leaving the second compressor and flowing through heat exchangers 421 and 431. A person skilled in the art will recognize that such a two-stage compression plus Rankine-cycle system may be designed in any number of arrangements, with a varying number of heat exchangers and other components, depending on a number of considerations. For example, the intercooler 462 could be replaced by an equivalent evaporative cooler with water injection, which would eliminate the need for one of the heat exchangers, 411, and would eliminate the need for a split flow of the Rankine-cycle working fluid. This specification intends to cover all such permutations of a two-stage, or multi-stage compression system for converting moist air into water and power.

The two-stage compression system 401 for converting moist air into water and power, as shown in FIG. 4, is modeled below using thermodynamic properties evaluated as is known in the art. The laws of thermodynamic conditions are imposed on each of the components of the system. The following calculations, temperatures, pressures, etc., are provided only as examples.

As illustrated in FIG. 4, a series of numbers are utilized to illustrate different conditions (such as temperature, pressure, energy) at different points in the process of the two-stage compression system of the present invention. This series of numbers only illustrate the calculated conditions within FIG. 4 and are distinguished from similar numbers utilized to illustrate components of the systems illustrated in FIGS. 1a and 1b, as well as other numbers utilized to illustrate calculated conditions within FIGS. 5 and 6. Looking to FIG. 4, water vapor circulates along the path from the vapor separation module 451 to discharge point 490. In contrast, the intercooler 462 between the compressors of the compressor module 452 uses water in a continuous circulation circuit. The turbine also uses water as the continuous circuit working fluid in the Rankine-cycle loop. Because the net output of the Rankine-cycle depends on the working-fluid properties, other fluids besides water could be used to possibly increase Rankine-cycle efficiency, as is known in the art. The condenser (HX4) for the Rankine-cycle is also water cooled from a cold liquid reservoir, although other alternatives are possible as further discussed below.

Intercooler 462 is liquid cooled, with the water-vapor discharge temperature, $T_7$, set to be 20 C (36 F) above the saturation temperature at the discharge pressure, $P_7$, i.e. $T_7=T_{sat}(P_7)+20$. This maintains a high quality steam for the input to the second compressor of the module 452. Increasing $T_7$ further results in a slight decrease in output power, but a rather large increase in power required by the second compressor of module 452 and is disadvantageous. The outlet temperature, $T_{27}$, of intercooler 462 was set 10 C (18 F) below the output temperature, $T_6$, of the first compressor of module 452, i.e., $T_{27}=T_6-10$. The outlet temperature, $T_{19}$, of heat exchanger 411 is 10 C (18 F) lower than the outlet temperature, $T_{27}$, of intercooler 462, which is also the high temperature input to the heat exchanger 411, i.e., $T_{19}=T_{27}-10$. The outlet temperature, $T_{18}$, for the Rankine working fluid is 10 C (18 F) lower than the high-temperature output, $T_9$, of the third heat exchanger 431, $T_{18}=T_9-10$. The temperature of the Rankine working fluid into condenser (HX4), was set to 32 C (89.60 F) to maintain the steam quality leaving the turbine. A common value for the liquid cooling reservoir temperature, $T_{23}$, is 15 C (59 F) or 288 K (518.40 R).

The overall optimization for maximum work output from the turbine has numerous inputs. Optimization in these calculations uses reasonable choices for operating temperatures. The thermal properties of intercooler 462 and Rankine-cycle working fluids were adjusted to minimize entropy in the heat exchangers by varying the pressure. While testing different conditions, a systematic trend emerged in the optimization of the Rankine cycle pressure: the input pressure to the turbine, $P_{21}$, is slightly greater than the output pressure of the second compressor, $P_8$.

The net output power ($P_{out}$) is the sum of power generation less the expenditure from the turbine ($P_{turbine}$), compressors ($P_{C1}$, and $P_{C2}$), pumps ($P_{P1}$, $P_{P2}$, $P_{P3}$, and $P_{P4}$), and fan ($P_{in,fan}$) used in the system:

$$P_{out}=P_{turbine}-P_{C1}-P_{C2}-P_{P1}-P_{P2}-P_{P3}-P_{P4}-P_{in,fan}$$

This power, which can be converted to electricity by a generator, is the net output power for the two stage compression system for converting moist air into water and power as shown in FIG. 4.

The herein disclosed systems may alternatively utilize a series of compressors. FIG. 5 shows a three stage compression system 501 utilizing three compressors (C1, C2 and C3) and a working fluid moving through a Rankine-cycle. Compressor module 552 includes the three compressors, enabling increased compression of the water vapor over what would be possible using only one compressor or using two compressors. As seen in FIG. 5, a first intercooler 562 may be used between the first two compressors of module 552, and a second intercooler 563 may be used between the second and the third compressors of module 552. Three-stage compression may require that the first compressor of module 552 be significantly larger than the second and third compressors, because of the large volume of low-pressure water vapor drawn through vapor separation module 551. It is, however, possible to arrange several smaller compressors in parallel to achieve the same effect as using a very large first compressor.

Figure 6:
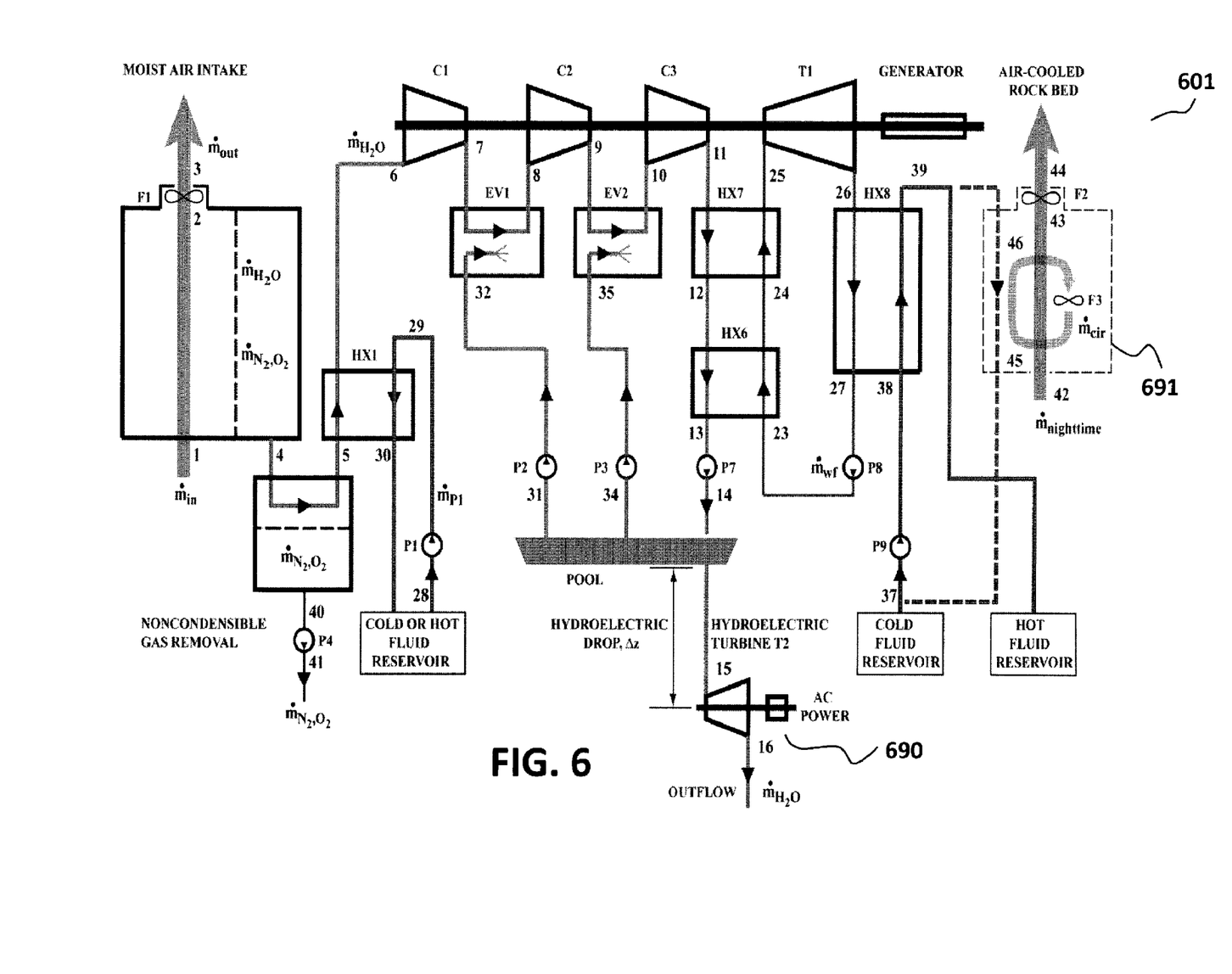
FIG. 6 illustrates an alternative exemplary three-stage compression plus Rankine-cycle system for converting moist air into water and power wherein evaporative coolers and utilized in place of intercoolers, in accordance with the present invention.

A system designed for three-stage compression may utilize four Rankine-cycle heat exchangers 511 (HX4), 521(HX5), 531(HX6), and 541(HX7). The Rankine-cycle working fluid is heated by intercooler 562 at heat exchanger 511, by intercooler 563 at heat exchanger 521, and by condensation of the water vapor leaving the third compressor at heat exchangers 531 and 541. A person skilled in the art will recognize that such a three-stage compression plus Rankine-cycle system may be designed in any number of arrangements, with a varying number of heat exchangers and other components, depending on a number of considerations. For example, the intercoolers 562 and 563 could be replaced by equivalent evaporative coolers with water injection, which would eliminate the need for two of the heat exchangers, 511 and 521, and would eliminate the need for a split flow of the Rankine cycle working fluid. Such a three-stage compression system with evaporative coolers is shown in FIG. 6 as an example. This specification intends to cover all such permutations of a three-stage or multi-stage compression system for converting moist air into water and power.

Traditionally, Rankine-cycle and other power generation plants utilize a nearby body of relatively cool water to condense and/or cool the working fluid exiting the turbine, as shown in FIGS. 1a, 1b, 4-6. The herein disclosed systems may be alternatively designed to utilize air-cooled rock-bed heat exchangers in place of, or in combination with, a body of relatively cool water. In arid geographic locations the moisture in the ambient air may be enough to supply water vapor for a herein disclosed system, but such cooling water may not be readily available. Luckily in such arid locations daytime and nighttime temperatures vary significantly. When night air is 10 C (18 F) to 15 C (27 F) cooler than the daytime high temperature, it can be used at night to cool a rock-bed. A thermal reservoir made of rock that forms a porous structure may be used to cool the working fluid exiting the turbine. Such a rock-bed heat exchanger is shown in FIG. 4 at 491, in FIG. 5 at 591, and in FIG. 6 at 691. The vaporized and/or high temperature working fluid may be fed through a relatively cool bed of rock to condense and/or cool the working fluid in a liquid-to-gas heat exchanger which may use a fan to circulate air through the cool rock-bed. The rock is kept cool by fanning relatively cold air through the rock bed at night.

Hornfels, or hornfellic rock, have desirable properties for use as an air-cooled rock-bed heat exchanger. Hornfels have a density of 2,600 kg/m3 (173.62 lbm/ft3), a specific heat of 1.470 kJ/kg-C (351.09 Btu/lbm-F), a thermal conductivity of 4 W/m-C (2.311 Btu/hr-ft-F), and a thermal diffusion constant of 1.046 m2/s (11.25 ft2/s). Other rock with similar properties may also function as an air-cooled rock-bed heat exchanger.

As stated throughout this specification, a by-product of the transfer of heat from the compressed water vapor to the thermodynamic-cycle working fluid is output water. In other words, the herein disclosed system inputs moist air and outputs water and electrical power. The output water can, of course, be used for any desirable purpose. One such purpose is to utilize a hydrodynamic elevation drop to generate electrical power. FIG. 5 at 590, and FIG. 6 at 690, illustrate such a use of the output water. The output water may be directed to flow through a hydroelectric turbine (which may alternatively be referred to as a water turbine) to generate electrical power. For example, the system for converting moist air into water and power may be located at a relatively high elevation. The output water may be collected in some sort of basin, and then allowed to flow down from the relatively high elevation through a hydroelectric turbine, generation electrical power.

The output water may be used in other practical ways as well. If the output water is used to irrigate crops, trees, or other plants that otherwise may struggle in the local climate, such a use may bring the herein disclosed system from being merely carbon neutral (i.e., this system does not burn carbon in its operation) to carbon negative and $O_2$ positive. The plants which otherwise would not grow can use the output water to thrive, thereby absorbing $CO_2$ and producing $O_2$.

Finally, the herein disclosed systems for converting moist air into water and power can also be described as related methods for converting moist air into water and power. All the preceding discussion of the various embodiments of the system applies equally to methods for converting moist air into water and power. For example, a method for converting moist air into water and power includes: drawing moist air through a vapor separation module, separating enriched water vapor from the moist air, compressing the enriched water vapor in a compressor module, transferring heat from the enriched water vapor to a working fluid, and then moving that working fluid through a thermodynamic cycle such as the Rankine-cycle (or alternatively the Stirling-cycle, the Ericsson-cycle, and other similar thermodynamic-cycles).

The herein disclosed systems and methods may be advantageously utilized at a wide spectrum of locations throughout the United States and worldwide. Relatively humid climates, such as Miami, Fla., provide high moisture content in the local air, and so such a location may be ideal for the present invention. A high moisture level means that relatively less volume of air needs to be drawn through the vapor separation module to obtain an equal volume of water vapor. For the same reason, less compressor power, or less compression, may be needed in such a high moisture location. Arid climates such as Reno, Nev., however, provide significantly less natural moisture in the air, and so a relatively larger volume of air must be drawn through the vapor separation module. For similar reasons, arid locations require relatively greater compressor power, or relatively more compression. Consequently, two-stage compression systems and methods may be more appropriate for humid locations while three-stage compression systems and methods may be more appropriate for arid locations. Similarly, humid locations may require less overall barrier surface area for the vapor separation module than do arid locations.

As described above for the various embodiments of the systems, the methods of converting moist air into water and power involve general steps that may be carried out in numerous possible ways. For example, the step of compressing in a compressor module may involve only one compressor and no intercooling, it may involve a three-stage compression using three compressors and two intercooling steps in between each compression, or it may involve an alternative or hybrid compression process. Those skilled in the art will recognize that all permutations of the herein described embodiments of the systems and methods for converting moist air into water and power are possible.

While the present invention has been illustrated and described herein in terms of a preferred embodiment and several alternatives associated with systems and methods for converting moist air into water and power, it is to be understood that the various components of the combination and the combination itself can have a multitude of additional uses and applications. Accordingly, the invention should not be limited to just the particular descriptions and various drawing figures contained in this specification that merely illustrate one or more preferred embodiments and applications of the principles of the invention. Furthermore, all dimensions and calculations are provided only as examples and are not meant to limit this disclosure solely to those conditions.

What is claimed is:

1. A system for converting moist air into power and output water, comprising:
   a vapor separator for collecting water vapor from the moist air;
   a compressor for compressing the water vapor into a compressed water vapor;
   a heat exchanger for extracting heat from the compressed water vapor and generating the output water; and
   a turbine for generating power from the extracted heat.

2. The system as claimed in claim 1, wherein the vapor separator includes one or more barriers that are permeable to the water vapor and less permeable to $N_2$ and $O_2$.

3. The system as claimed in claim 2, wherein the one or more barriers are formed of a type of plastic.

4. The system as claimed in claim 3, wherein the one or more barriers are formed of cellulose-acetate.

5. The system as claimed in claim 2, wherein the one or more barriers are arranged in parallel.

6. The system as claimed in claim 5, wherein the one or more barriers are arranged within one or more shipping containers, the one or more shipping containers having one or more moist air intake apertures.

7. The system as claimed in claim 6, wherein each shipping container among the one or more shipping containers has a length of approximately 40 feet and includes approximately 450 barriers arranged so that the moist air flows across a width of each shipping container.

8. The system as claimed in claim 6, wherein each shipping container among the one or more shipping containers has a length of approximately 40 feet and includes approximately 76 barriers arranged so that the moist air flows along the length of each shipping container.

9. The system as claimed in claim 1, further comprising a fan to draw the moist air across the vapor separator.

10. The system as claimed in claim 9, wherein the fan is a wind-turbine for generating electrical power when atmospheric conditions naturally draw the moist air across the vapor separator.

11. The system as claimed in claim 1, further comprising a wind-turbine for generating electrical power when atmospheric conditions naturally draw the moist air across the vapor separator.

12. The system as claimed in claim 1, further comprising a noncondensable gas removal system for removing noncondensable gas from the water vapor.

13. The system as claimed in claim 1, further comprising a second compressor, a second heat exchanger, a third heat exchanger and an intercooler, the second compressor compressing the compressed water vapor, the intercooler extracting heat from the compressed water vapor, the second heat exchanger and the third heat exchanger extracting heat from the compressed water vapor, and the third heat exchanger further generating the output water.

14. The system as claimed in claim 13, wherein a working fluid for the turbine is cooled by an air-cooled rock-bed.

15. The system as claimed in claim 13, wherein a working fluid for the turbine is cooled by relatively cool water from a nearby body of water.

16. The system as claimed in claim 13, wherein the intercooler is evaporative.

17. The system as claimed in claim 1, further comprising a series of compressors for further compressing the water vapor, a series of intercoolers for further extracting heat from the compressed water vapor, and a series of heat exchangers for further extracting heat from the compressed water vapor and further generating the output water.

18. The system as claimed in claim 17, wherein a working fluid for the turbine is cooled by an air-cooled rock-bed.

19. The system as claimed in claim 17, wherein a working fluid for the turbine is cooled by relatively cool water from a nearby body of water.

20. The system as claimed in claim 17, wherein the series of intercoolers are evaporative.

21. The system as claimed in claim 1, further comprising a hydroelectric turbine for generating power from the output water flowing down an incline.

22. A system for converting moist air into power and output water, comprising:
    a vapor separator for collecting water vapor from the moist air;
    a compressor module for compressing the water vapor into a compressed water vapor; and
    a thermodynamic-cycle power generation module for extracting heat from the compressed water vapor to generate power and extracting water from the compressed water vapor.

23. The system as claimed in claim 22, wherein the vapor separator includes one or more barriers that are permeable to water vapor and less permeable to $N_2$ and $O_2$.

24. The system as claimed in claim 23, wherein the one or more barriers are formed of a type of plastic.

25. The system as claimed in claim 24, wherein the one or more barriers are formed of cellulose-acetate.

26. The system as claimed in claim 23, wherein the one or more barriers are arranged in parallel.

27. The system as claimed in claim 26, wherein the one or more barriers are arranged within one or more shipping containers, the one or more shipping containers having one or more moist air intake apertures.

28. The system as claimed in claim 27, wherein each shipping container among the one or more shipping containers has a length of approximately 40 feet and includes approximately 450 barriers arranged so that the moist air flows across a width of each shipping container.

29. The system as claimed in claim 27, wherein each shipping container among the one or more shipping containers has a length of approximately 40 feet and includes approximately 76 barriers arranged so that the moist air flows along the length of each shipping container.

30. The system as claimed in claim 22, wherein the vapor separator includes a fan to draw the moist air across the vapor separator.

31. The system as claimed in claim 30, wherein the fan includes a wind-turbine for generating power when atmospheric conditions naturally draw the moist air across through the vapor separator.

32. The system as claimed in claim 22, wherein the vapor separator includes a wind-turbine for generating power when atmospheric conditions naturally draw the moist air across the vapor separator.

33. The system as claimed in claim 22, wherein the vapor separator includes a noncondensable gas removal subsystem.

34. The system as claimed in claim 22, wherein the compressor module includes two compressors for compressing the water vapor, wherein the thermodynamic-cycle power generation module includes three heat exchangers for extracting heat from the compressed water vapor, and further comprising an intercooler subsystem between the two compressors for extracting heat from the compressed water vapor.

35. The system as claimed in claim 34, wherein a working fluid for the thermodynamic-cycle power generation module is cooled by an air-cooled rock-bed.

36. The system as claimed in claim 34, wherein a working fluid for the thermodynamic-cycle power generation module is cooled by relatively cool water from a nearby body of water.

37. The system as claimed in claim 34, wherein the intercooler subsystem is evaporative.

38. The system as claimed in claim 22, wherein the compressor module includes three compressors for compressing the water vapor, wherein the thermodynamic-cycle power generation module includes at least three heat exchangers for extracting heat from the compressed water vapor, and further comprising an intercooler subsystem between the three compressors for extracting heat from the compressed water vapor.

39. The system as claimed in claim 38, wherein a working fluid for the thermodynamic-cycle power generation module is cooled by an air-cooled rock-bed.

40. The system as claimed in claim 38, wherein a working fluid for the thermodynamic-cycle power generation module is cooled by relatively cool water from a nearby body of water.

41. The system as claimed in claim 38, wherein the intercooler subsystem is evaporative.

42. The system as claimed in claim 22, further comprising a hydroelectric turbine for generating power from the output water flowing down an incline.

43. The system as claimed in claim 22, wherein the thermodynamic-cycle is a Stirling-cycle.

44. The system as claimed in claim 22, wherein the thermodynamic-cycle is an Ericsson-cycle.

45. The system as claimed in claim 22, wherein the thermodynamic-cycle is a Rankine-cycle.

46. A method for converting moist air into power and output water, comprising the steps of:
    drawing moist air across a vapor separator;
    separating water vapor from the moist air;
    compressing the water vapor in a compressor module into a compressed water vapor;
    transferring heat from the compressed water vapor to a working fluid; and
    moving the working fluid through a thermodynamic-cycle to generate the power and generate the output water.

47. The method as in claim 46, wherein the step of separating includes the step of removing noncondensable gasses from the water vapor.

48. The method as in claim 46, further comprising the step of generating hydroelectric power from the output water flowing down an incline.

49. The method as in claim 46, wherein the step of separating includes a step of pulling water vapor through one or more barriers by creating a pressure differential between an atmospheric side of the one or more barriers and a compressor module side of the one or more barriers.

50. The method as in claim 49, wherein the one or more barriers are permeable to water vapor and less permeable to $N_2$ and $O_2$.

51. The method as in claim 46, wherein the step of moving the working fluid through a thermodynamic-cycle includes the step of condensing the working fluid with an air-cooled rock-bed.

52. The method as in claim 46, wherein the step of compressing includes the step of compressing water vapor utilizing two or more compressors.

53. The method as in claim 52, wherein the step of compressing water vapor includes the step of intercooling between each of the two or more compressors.

54. The method as in claim 53, wherein the intercooling is evaporative.

55. The method as in claim 46, wherein the thermodynamic-cycle is a Rankine-cycle.

56. The method as in claim 46, wherein the thermodynamic-cycle is a Stirling-cycle.

57. The method as in claim 46, where the thermodynamic-cycle is an Ericsson-cycle.

* * * * *